United States Patent [19]

Rones

[11] 4,162,344

[45] Jul. 24, 1979

[54] POROUS RESIN IMPREGNATED STRATIFIED FIBER FLEXIBLE SHEET BACKED MAT AND PROCESS OF FORMING THE SAME

[75] Inventor: James M. Rones, Atlanta, Ga.

[73] Assignee: American Manufacturing Company, Atlanta, Ga.

[21] Appl. No.: 928,334

[22] Filed: Jul. 27, 1978

[51] Int. Cl.$^2$ .................... B32B 7/02; B32B 31/00
[52] U.S. Cl. .................... 428/212; 156/62.6; 156/298; 428/288; 428/290; 428/297; 428/302
[58] Field of Search ............... 428/212, 218, 282, 286, 428/287, 288, 289, 290, 357, 359, 365, 284, 297, 298, 302; 156/62.6, 62.8, 298

[56] References Cited

U.S. PATENT DOCUMENTS

| | | | |
|---|---|---|---|
| 2,765,247 | 10/1956 | Graham | 428/212 |
| 3,330,713 | 7/1967 | Watson et al. | 156/298 X |
| 3,341,394 | 9/1967 | Kinney | 156/167 X |
| 3,595,731 | 7/1971 | Davies et al. | 428/151 |
| 3,755,028 | 8/1973 | Wood | 156/62.8 X |
| 3,917,448 | 11/1975 | Wood | 156/62.2 X |

*Primary Examiner*—Lorraine T. Kendell
*Attorney, Agent, or Firm*—Sughrue, Rothwell, Mion, Zinn and Macpeak

[57] ABSTRACT

Heavy and light denier fiber are opened, forced air transported and gravity deposited to form a stratified layer open mesh web, sprayed with resin on respective sides with the resin cured to set the fiber of the web. The web is preferably cut into sheet form and as mats deposited with the fine denier fiber facing downwardly on a formed sheet of uncured rubber, PVC or like backing material. The surface portion of the fine denier fiber layer of the stratified multi-layer mats are embedded within the backing surface material and the backing material subsequently cured to solidly lock the mat to the backing surface. The formed stratified layer mats with backing surface may be employed as bath mats or the like or the mats cut into sections to form abrasion pads.

2 Claims, 4 Drawing Figures

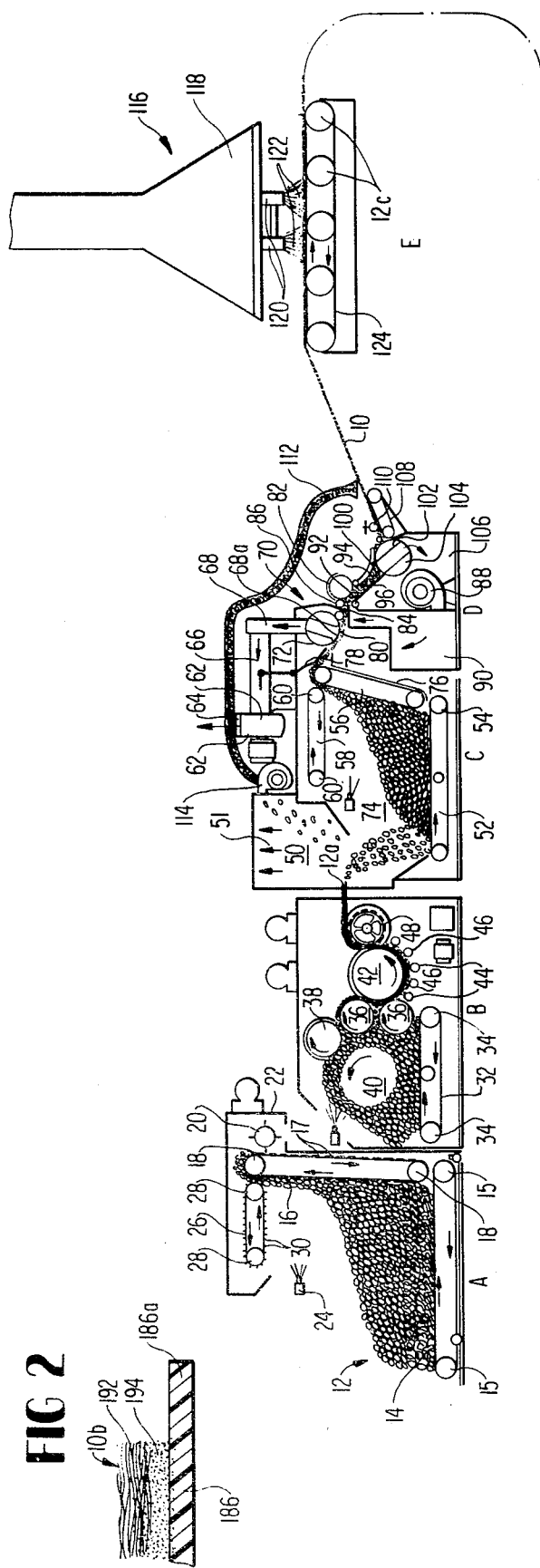
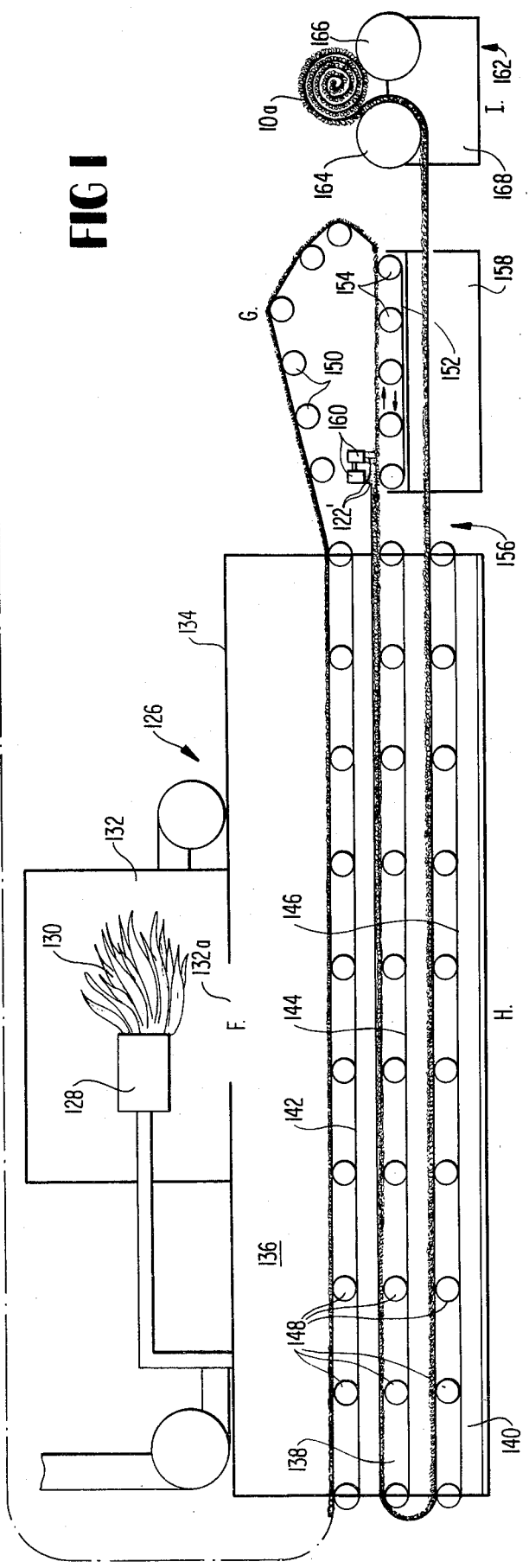
FIG 1
FIG 2

POROUS RESIN IMPREGNATED STRATIFIED FIBER FLEXIBLE SHEET BACKED MAT AND PROCESS OF FORMING THE SAME

FIELD OF THE INVENTION

This invention relates to the manufacture of porous fiber pads such as abrasion pads, floor mats and the like and, more particularly, to a mat or pad having a non-porous flexible backing surface and to the method of manufacturing the same.

BACKGROUND OF THE INVENTION

In recent years, there has developed the need for abrasion pads formed of artificial fibers in lieu of steel or metal fiber abrasion pads which resist wear, which are highly porous and which retain the pad shape during pad use.

Additionally, in the field of small size foot pads or mats such as bath mats, or strips of matting as walkways, there has developed the need for such mats which are capable of being easily handled yet resist wear and which permit ready cleaning and which are attractive to the view.

Attempts have been made to provide such pads and mats of non-woven fibers to meet this existing need. The problems, both in abrasion pads and in bath mats, door mats or strip matting for heavy traffic walkways, is that the non-woven fiber mats and pads have a tendency to be deformed during use and are of short life due to the requirements of porosity and retention of shape due to the short length of the individual fibers making up the non-woven elements. Further attempts have been made to partially embed the non-woven fiber mats or pads in a sheet of rubber, plastic or the like to provide a backing surface to maintain the non-woven fibers in place and to maintain the desired porosity. The composite structures to date have been disappointing in that the non-woven material tends to separate readily from the backing material, particularly under heavy use.

It is, therefore, a primary object of the present invention to provide an improved porous non-woven fiber mat or pad in which the formed products have greater resistance to deformation and wear, particularly under heavy use.

It is a further object of the present invention to provide an improved composite non-woven fiber mat or pad in which the non-woven components are securely locked to the backing material.

SUMMARY OF THE INVENTION

One aspect of the present invention is directed to an improved unitary wear resistant, non-woven, porous mat comprising a layer of non-woven, omni-directional, resin impregnated fiber including a first stratified sublayer of fine denier fiber and a second stratified sublayer of coarse denier fiber. The mat further comprises an integral sheet of cured backing material bonded to the surface fibers of the fine denier fiber sublayer of the resin impregnated fiber layer with a surface portion of the fine denier fiber sublayer being embedded within the backing material. Preferably, the backing sheet is formed of one material of the group consisting of rubber, polyvinyl chloride (PVC), and flexible polyurethane.

The stratified non-woven porous mat or pad may be formed by feeding batches of fine denier fiber and coarse denier fiber to a fiber-prefeeder for blending and for opening of the fiber in a blender and a web of such material is formed on the surface of a revolving cylinder condenser screen subjected to vacuum pressure with the heavier denier fiber first contacting the screen to effect stratification of the fiber layer forming the web into an inner coarse denier layer and an outer fine denier layer. The stratified fiber web is sprayed on both sides with resin and heat cured to form a stratified layer non-woven fiber web. The web may be severed into sheets of given mat size which are gravity dropped onto an unset backing web of rubber, PVC or the like, with the fine denier fiber surface downward such that the surface layer of the fine denier stratified layer of the non-woven fiber is embedded within the backing material, and upon curing of the backing material, is securely bonded thereto. Preferably, the backing material in uncured web form has a width in excess of the width of the non-woven fiber mat and the mats are spaced apart on the uncured backing material such that upon curing, and by severing the cured backing material web intermediate of the mats, individual mats with backing material edging on all four sides results. The formed mats may be further sectioned to form individual pads. The non-woven fiber components may be subjected to a liquid for coloring of the mats. Further, abrasive materials applied to the fiber permits the formation of abrasion pads by suitably cutting up the formed mats subsequent to backing material curing to provide an edging for the mats.

BRIEF DESCRIPTION OF THE DRAWINGS

FIG. 1 is a schematic, elevational view of an apparatus for manufacturing the stratified layer non-woven, resin impregnated fiber web material of the present invention.

FIG. 2 is a sectional view of a portion of the web material produced by the apparatus of FIG. 1, further provided with a backing material in the manner of the apparatus of FIG. 3.

DESCRIPTION OF THE PREFERRED EMBODIMENT

Figure 3:
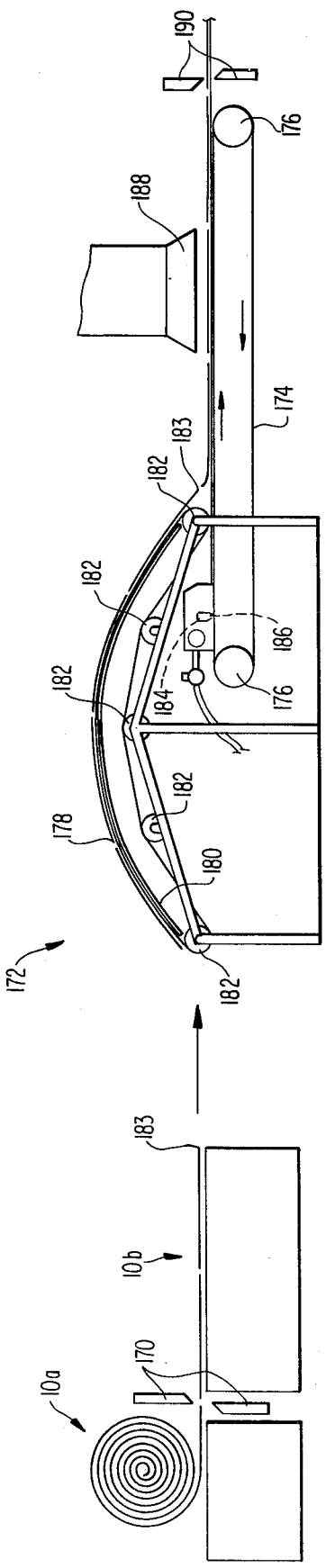
FIG. 3 is a side elevational view of an apparatus for providing a backing surface to the stratified layer non-woven fiber web material provided by the apparatus of FIG. 1.
Figure 4:
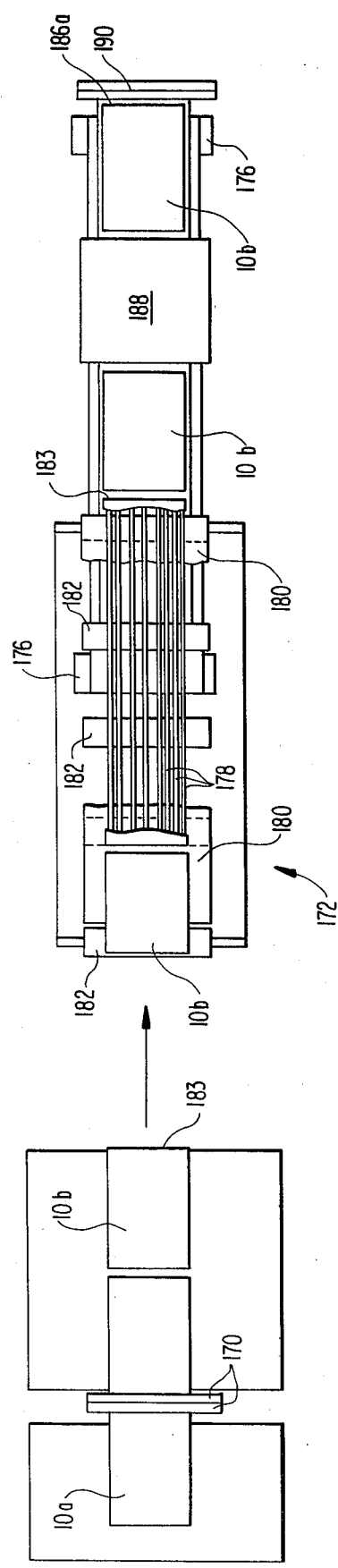
FIG. 4 is a top plan view of the apparatus of FIG. 3.

Turning to the drawings, FIG. 1 is a somewhat schematic elevational view of an apparatus for producing a stratified layer, non-woven, omni-directional, resin impregnated fiber web of the present invention and prior to providing a backing surface to that formed web, which process is achieved by the utilization of the apparatus of FIGS. 3 and 4. The end product, in its preferred form, is illustrated in section, in FIG. 2.

With respect to FIG. 1, the apparatus is comprised of a number of operating stations, specifically, at station A is a fiber-prefeeder; at station B, a fiber-opener blender; at station C, a fiber-feeder; at station D, is a fiber-webber, at station E, is a web resin sprayer; station F is an upper layer resin curing station for the web; at station G is a web bottom spray booth; station H is a bottom layer resin curing station, and station I is a roll-up station.

The componentry of stations A-D inclusive comprises a commercial section of the apparatus in which a non-woven omni-directional fiber web is formed in a process known as a RANDO-WEB ® process, to which the present invention has application purely in terms of the effect of stratification of the omni-directional open fiber formed in the area of the fiber-webber of station D. The present invention involves an appreciation of the fact that by supplying appropriate masses of fine denier fiber and coarse denier fiber at the fiber-prefeeder station A, a stratified fiber web 10 is formed at the exit of the fiber-webber station D for movement to the spray booth of station E. In that regard, fiber stock in dry fiber form as slabs in bales of both fine denier fiber and coarse denier fiber is placed in the hopper of the fiber-prefeeder at station A, as at 12, onto an endless belt of floor apron 14 mounted on rollers 15 and which is driven clockwise as shown, causing the fiber 12 to move from left to right, thus introducing the stock to the elevating apron 16 constituting an endless belt movable on its set of rollers 18 in a clockwise direction as shown by the arrow. The elevating apron 16 includes pins 17 which project outwardly from its outer surface such that the stock on the pins of the elevating apron pass over the top and is discharged by a doffer roll 20 at a uniform rate through a sheet metal housing 22 into the fiber-opener blender at station B. Appropriately, a nozzle or spray device 24 is provided at station A for spraying an anti-static spray solution onto the fiber 12. The excess stock on the elevating apron 16 is removed by a horizontally oriented stripper apron 26 which rotates counterclockwise on its rollers 28, the stripper apron also having pins at 30 on the outer surface of the same picking up the excess stock and returning it to the hopper of the fiber-prefeeder. The function of the elevating and stripper aprons is to reduce the slabs of fiber to high density tufts.

The high density tufts of fiber which are passed through the fiber-opener blender B fall onto a second, floor apron 32 which revolves clockwise supported by rollers 34, the floor apron 32 directing the high density tufts to a pair of worker rolls 36. The worker rolls 36 comprise wire cloth and function to take a small amount of fiber for opening of the fiber. There is further provided a stripper roll 38. The rolls 36 and 38 are mounted for rotation about their axes and are driven (by means not shown), the stripper roll 38 taking the excess fiber and because of its rotation which is clockwise and the same as rolls 36, causes the fiber to circulate in the hopper area as indicated by arrow 40. It is required that an adequate supply of circulated fiber be provided at all times to insure a maximum web production rate. Varying the speed of the worker rolls 36 increases or decreases the amount of fiber opening. The partially open fiber passes from the two working rolls 36 to a main cylinder 42 which is also mounted for rotation about its axis which is horizontal and being driven counterclockwise where additional opening and blending takes place. It functions to convey the fibers to three paris of small metallic wire cloth worker rolls 44 and stripper rolls 46 for additional working. The apparatus at the fiber-opener blender of station B includes an air brush at 48 for doffing the open fiber mechanically. The air brush 48 generates a high velocity air stream which carries the fiber from the fiber-opener blender as shown at 12a into a fiber separator 50, the high velocity air exiting at 52 with the open fiber dropping downwardly and onto a third, floor apron 52 which is located within the fiber-feeder station C. The floor apron rotates counterclockwise supported by rolls 54 and moves the open fiber stock from left to right to an inclined elevating apron 56, provided with slots and pins (not shown). The elevating apron 56 raises the open fiber to a stripper apron 58 which is horizontally oriented and functions very much the same as stripper apron 26. This apron constitutes an endless belt, having pins (not shown) on its outer surface, and is supported by opposed rollers 60 and is driven counterclockwise. At this point, the excess stock is removed by the stripper apron 58 and is returned to the hopper of the fiber-feeder at station C.

At the fiber-feeder, station C, there is provided within a portion of the apparatus, a blower 62 having a discharge at 64 and being connected by ducts 66 and 68 to a liquorin indicated generally at 70. The liquorin 70 comprises a feed web condenser screen 72 of cylindrical form, cooperating with the duct 68 such that the inlet opening 68a of that duct is covered by the rotating condenser screen 72 and with the air flow being communicated to the lower housing or hopper area 74 of the fiber-feeder and defining with walls 76 and 78 an air bridge as at 80 such that the small open tufts of fiber remaining on the pins of the elevating apron pass over the top and into the area of the air bridge. Doffing of the fiber is accomplished by the flow of air over the pins of the elevating apron into the air bridge and the flow rate of this air which determines the quantity of stock conveyed is governed both by the speed of continuous feed mat formation on the condenser screen 72 and on the volume of air as provided by the blower 62. With air as the conveying medium, most heavy materials such as tramp metal, wood trash, and even burs drop out and are collected in the trash chamber at the bottom of the elevating apron 56. Since air pressure beyond the feed mat condenser screen 72 is below atmospheric pressure, air must flow through the condenser screen into the suction ducts 66, 68, as indicated by the arrows.

As the feed mat takes shape, th air flow is cut down by the resistance of the fibers of the feed mat on the condenser screen 72 and in the throat of the air bridge 80. Proportionately less doffing occurs until a condition of equilibrium is reached. A sufficient number of tufts are doffed to form a continuous uniform feed mat and the excess fiber not carried across the air bridge 80 is returned by the pins of the elevating apron to the hopper of the fiber-feeder, station C.

The last station of this known piece of apparatus, the fiber-webber at station D, comprises the RANDO-WEBBER ®. The RANDO-WEBBER includes principally the liquorin 82 which is just downstream of a feed plate 84 and cooperates with a feed roll 86 such that the feed roll 86 feeds the mat into the concave surface of a nose bar (not shown) and exerts a hold action as the feed mat is fed over the top of the nose bar and into the path of liquorin 82. The liquorin 82 functions to comb individual fibers from the feed mat and introduce them into an air stream generated by the RANDO-WEBBER fan or blower 88. The blower 88 discharges into a duct 90 which opens at the nose bar. Conventionally, a saber 92 acts in conjunction with the liquorin to control the velocity of the air flow, the saber 92 being set or supported in eccentric bushings such that when the saber 92 is rotated, the opening between the saber 92 and the liquorin 82 narrows and widens, increasing or decreasing the air velocity much in the manner of a venturi as at 94. The airborne fiber is carried within a duct defined by a plate 96 and a curved and pivotable duct cover 100 forming a volume of increasing size in a downstream direction and opening to a duct 102 within a cylindrical web forming condenser screen 104 for forming the stratified non-woven fiber web 10.

It is very important to note that the present invention determines that by employing two forms of stock fiber, that is, of fine and coarse denier, by an action accomplished in the area of the air flow passage on the downstream side of the venturi 28, stratification of the open fiber occurs such that the heavier, coarse denier fiber makes initial contact with the surface of the rotating cylindrical web forming condenser screen 104 with the lighter fiber forming an outer layer thereon and being extracted from the surface of the screen as it revolves and with the air passing through the screen and entering the inlet to the blower 88 by way of duct 106. While it is true that the fiber is uniformly deposited on the revolving condenser screen 104 and is aerodynamically formed into a continuous random fiber web structure, it is further true that because of the nature of the stock which enters the fiber-prefeeder station A, stratified layers of upper or outer fine denier fiber and the lower, coarse denier fiber is achieved. A takeaway or discharge conveyor 108 is provided at the discharge side of the revovling condenser screen 104. A slitter assembly as at 110 may be provided for severing a surface portion of the fiber web and permitting a uniform thickness web 10 to be discharged for movement to the spray booth at station E. The excess of the stratified layered non-woven open fiber web 10 is returned through a duct 112 under operation of a further blower 114 to the fiber separator area 50 for re-entry along with fresh material from the fiber-opener blender of station B and gravity deposited on the floor apron 52 of the fiber-feeder at station C.

The formed stratified layer web 10 of random oriented fiber, in exciting from the webber at station D, is directed to a first web spray booth indicated generally at 116 forming station E, where a liquid resin or like thermosetting binder impregnates the fiber web to coat the individual fibers of the stratified layers and to lock them together subsequent to curing of the resin. The resin may comprise phthalate and aromatic plasticizers or vinyl resins and is supplied to the spray nozzles 120 by means (not shown), the nozzles opening downwardly and forming a fine spray of the resin as at 122 to coat the web 10, in this case from the fine denier fiber side of the web. The web is supported and transported through the spray booth by means of an endless conveyor belt 124 carried by spaced rollers as at 126, belt 124 driven clockwise by means (not shown). The web 10, after being partially impregnated with resin from its upper surface downwardly, is directed to station F comprising a curing station and constituted principally by an oven indicated generally at 126. The oven 126 is standard and comprises a burner at 128, burning a gaseous hydrocarbon fuel or the like, as indicated by flame 130, and heating the interior of tis casing 132. The heated air passes through an opening as at 132a into the oven casing proper 134 to heat the interior of that casing as at 136. The oven is provided with three horizontally oriented and vertically spaced endless conveyor belts as at 142, 144 and 146, the belts being trained over rollers as at 148 in each instance and being driven in clockwise, counterclockwise and clockwise directions by means (not shown), respectively, to define an upper first run, an intermediate second run, and a lower third run for web 10. Appropriate openings (not shown) are provided for the web to enter and leave oven casing 134.

As can be appreciated, the resin provided by the first web spray booth 116 is almost fully cured during the first run of the web over the upper conveyor belt 142. At the exit of the first run, the web 10 is directed over a series of rollers 150 at station G of a second spray booth indicated generally at 156; the web 10 being reversed in direction and being inverted at the second spray booth 156. Web 10 moves on an endless belt 152 supported by rollers 154 and again driven by means (not shown). A pair of spray nozzles 160 direct resin at 122' in the form of fine spray on the uptruned web so as to further impregnate the fiber web with resin identical to that of spray 122 of first web spray booth 116. However, in this case, impregnation occurs from the coarse denier fiber layer downwardly due to the inversion of the web 10 at this point. After resin impregnation, the web 10 again moves into the oven 126 for a second run in contact with conveyor belt 124 and being carried by that conveyor belt as the conveyor belt is driven, in this case counterclockwise, FIG. 1. While the resin from the spray 122' is cured during the second run, to insure total curing of the resin from both sprays 122 and 122', the web 10 is again reversed in its direction with the fine denier fiber layer uppermost and passed again through the oven 126 as a third run supported by endless conveyor belt 146. With the resin fully cured the web in a highly porous form moves to the last station I of the apparatus shown in FIG. 1 constituting a roll-up mechanism indicated generally at 162. A pair of laterally spaced rollers 164 and 166 are mounted for rotation about their axes, oriented horizontally and supported by a fixed support member 168 such that the cured stratified layer fiber web may be rolled up. Alternatively, the web 10 is ready for use in that form or by severing produces, absent the backing of the present invention, locked fiber open face, walkway mats or the like. Additionally and downstream of the oven 126, the web 10 may be further treated with coloring fluid, abrasive particles or the like, for decorative and functional purposes, permitting the web, particularly when severed into small pad size, the open face fiber resin set pads to function as scrub or abrasion pads.

Turning next to FIG. 3, an important aspect of the present invention is the subsequent treatment of the formed and cured web 10 as it leaves the oven after resin impregnation and curing. As a matter of fact, the portions of the apparatus shown in FIG. 3 may constitute additional elements to the apparatus of FIG. 1 and may act as an extension thereof. However, in the illustrated form of the invention, the web in roll form as at 10a which is formed at the roll-up station I, in FIG. 1, is transported to the apparatus of FIG. 3. The roll 10a is simply unrolled and severed by means of relatively reciprocating cutting blades, indicated schematically at 170, to create from web 10a individual resin impregnated stratified fiber layer mats as at 10b. Each mat which is formed by severing of the web 10, may be employed in that form as at 10b, FIG. 3, as a shower mat, or it can be severed into small pads forming scouring pads or the like. It may, in fact, be further treated by the addition of abrasive powder bonded to the individual fibers of the two layer stratified fiber mat under conventional techniques. Preferably, the mats are subsequently bonded to a backing layer of a thermoplastic material such as PVC, rubber, or flexible polyurethane, by means of the remaining elements of the apparatus shown in FIG. 3.

Typically, the formed and rolled web 10a is severed into individual mats of rectangular sheet form with typical dimensions being 3'×5' and constituting a mat segment essentially 35"×58". The individual severed mats 10b are deposited at the backing layer station indicated generally at 172, this station comprising a large, endless conveyor belt 174 oriented horizontally, being supported between two horizontally spaced rollers 176 and being driven by means (not shown) in a clockwise direction. At the front or leading end of the apparatus of station 172, there is further provided a series of narrow endless conveyor belts, mounted by means of rollers 182 and driven by means (not shown) so as also to rotate in a clockwise direction, FIG. 3. The spaced endless belts 178 permit a mat as at 10b severed by operation of cutter blades 170, when placed in overlying fashion with respect to the plate 180, to move from left to right such that the leading end 183 of the mat falls off of the endless belts 178 in the vicinity of the downstream roller 182, towards the upper surface of the underlying conveying belt 174. The underlying conveying belt 174 forms a moving support for the backing material in liquid form, this material preferably being sprayed onto the surface of the endless conveying belt 174 by one or more nozzles as at 184. While the movement of the endless conveyor belt tends to cause the liquid backing material as at 180 emanating from nozzles 184 to be carried forwardly or from left to right, FIG. 3, in the direction of movement of the upper run of that endless belt, it may be necessary to employ a fixed doctor blade or the like underlying the spray nozzle 184 and to the rear of the nozzle opening to prevent any flow of liquid backing material in the wrong direction.

The temperature of the backing material is controlled such that it has the consistency of molasses at the point where the leading end 183 of the mat 10b contacts this backing material 186. Appropriate means are provided for limiting lateral flow of the liquid backing material to insure that the web formed backing material as at 186 will be slightly wider than the width of the mat 10b which falls onto the moving backing material carried by the endless belt 174.

The operator of the apparatus of FIG. 3 places the individual mats 10b onto the belts 178 such that they are approximately separated by two inches and additionally with the liquid backing material being formed slightly wider than the mats 10b when the mats are deposited by gravity action onto the underlying backing material, the mats are provided on all four edges with a border of backing material.

A very important aspect of the present invention is the feeding of the mats 10b such that their fine denier fibers are face down as the mats leave the conveyor belt 178. With the fine denier fibers of the stratified fiber layer being on the bottom side of mat 10b, a much smoother surface is provided than that of the coarse denier fibers defining the upper surface of this mat at the time of deposit onto the liquid backing material, thus allowing the mat to be mated to the liquid backing material such as liquid vinyl, the gravity deposit causing the surface layer of the fine denier fiber to be embedded within the liquid backing material. Where the backing material constitutes vinyl, the vinyl may be formed to an approximately 100 mil thickness, this being sufficient to provide the depth necessary to embed the surface fibers of the stratified fine denier layer, thus achieving a high integrity bond between the fiber mat and the backing material. With the mats 10b separated by approximately two inches, the endless conveyor belt 174 may transport the backing material and the fiber mat which is partially embedded therein to a curing oven indicated schematically at 188. Here, the backing material such as vinyl is subjected to heat, causing the vinyl to set or cure and achieving an excellent mechanical bond between the backing material and the individual fine denier fibers of the stratified fine denier fiber layer of mat 10b. Typical temperatures for effecting the curing of the resin impregnated stratified layer fiber web 10, are 250° to 350° F., wherein the resin to be impregnated constitutes vinyl, phenolic, melamine, latex or acrylic binders.

Further, with respect to the backing material, where the backing material constitutes a vinyl material, typical curing oven temperatures for oven 188 are in the order of 320° F. to 400° F.

Downstream of the curing oven, and in the vicinity of the discharge from the endless belt 174, there is provided another set of cutter blades as shown schematically at 190, which blades reciprocate relative to each other and act to sever the mats centrally at the point of separation between the individual mats which are now bonded to the backing material in web form. Assuming that the backing material is approximately two inches wider than the width of the individual mats and assuming that the mats are separated by two inches and severed centrally, there is provided a uniform one inch border or edging of backing material in the composite fiber and backing material mats. The resultant product, FIG. 2, is characterized by the mat indicated generally at 10b, being formed of the coarse denier fiber sublayer 192 remote from the backing material 186, the fine denier fiber sublayer 194 having its bottom surface fibers embedded within the backing material 186 and the product incorporating integrally a uniform border or edging of backing material as at 186a. The product in FIG. 2 may be subsequently severed to form abrasion pads or employed in its end as manufactured state as a bath mat or the like and is capable of hard use, particularly in the abrasion or scouring field, without attendant separation of the fiber portion of the mat product from its backing material.

While the invention has been particularly shown and described with reference to a preferred embodiment thereof, it will be understood by those skilled in the art that various changes in form and details may be made therein without departing from the spirit and scope of the invention.

What is claimed is:

1. A high integrity, form maintaining, wear resistant porous fiber mat comprising:
   a solitary, integral, composite non-woven omni-directional thermosetting binder impregnated fiber web consisting of a first stratified sublayer of coarse denier fiber and a second stratified sublayer of fine denier fiber, and
   an integral sheet of cured thermoplastic backing material bonded to the fine denier fiber stratified sublayer, with the surface portions of said fine denier fiber stratified sublayer being embedded within said thermoplastic backing material,
   whereby, said coarse denier fiber presents an outer surface layer having greater resistance to physical deformation and wear under heavy use, and said fine denier fiber stratified sublayer surface portion provides improved locking of the non-woven, omni-directional thermosetting binder impregnated fiber web to said backing material by partial embedment of the fine denier fiber stratified sublayer within said thermoplastic backing material.

2. The porous fiber mat, as claimed in claim 1, wherein said fiber is one material of the group consisting of nylon, polyester, and natural fibers; said thermosetting binder is one material of the group consisting of vinyl resin, phenolic binders, melamine binders and acrylic binders; and said thermoplastic backing material is one material of the group consisting of rubber, polyvinyl chloride, and polyurethane.

* * * * *